(12) United States Patent
Pasqualino

(10) Patent No.: US 7,250,980 B2
(45) Date of Patent: Jul. 31, 2007

(54) AUTOMATIC DETECTION OF SYNC POLARITY IN VIDEO TIMING AND GENERATION OF BLANKING PERIOD INDICATOR FROM SYNC INFORMATION

(75) Inventor: Christopher Pasqualino, Glendora, CA (US)

(73) Assignee: Broadcom Corporation, Irvine, CA (US)

( * ) Notice: Subject to any disclaimer, the term of this patent is extended or adjusted under 35 U.S.C. 154(b) by 587 days.

(21) Appl. No.: 10/034,413

(22) Filed: Dec. 27, 2001

(65) Prior Publication Data

US 2003/0122931 A1    Jul. 3, 2003

(51) Int. Cl.
*H04N 5/06* (2006.01)
*H04N 9/45* (2006.01)
*H04N 9/455* (2006.01)
(52) U.S. Cl. .................. 348/521; 348/194; 348/525
(58) Field of Classification Search ............. 348/500, 348/521, 525, 529–531, 194; *H04N 5/06, H04N 9/45, 9/455*
See application file for complete search history.

(56) References Cited

U.S. PATENT DOCUMENTS

| 5,394,171 | A | | 2/1995 | Rabii |
| 5,694,175 | A | | 12/1997 | Gaigneux et al. |
| 5,706,036 | A | * | 1/1998 | Lam et al. ............ 345/213 |
| 5,717,467 | A | * | 2/1998 | Shiki ................... 348/511 |
| 5,949,255 | A | * | 9/1999 | Shyu ................... 327/36 |
| 5,953,074 | A | | 9/1999 | Reddy |
| 6,008,791 | A | | 12/1999 | Arai et al. |

* cited by examiner

*Primary Examiner*—Trang U. Tran
(74) *Attorney, Agent, or Firm*—McAndrews Held & Malloy Ltd.

(57) ABSTRACT

The present invention relates to a system and method for generating a blanking period indicator signal from sync information in video timing. The invention comprises an auto polarity detect processor adapted to automatically detect the polarity of at least one sync signal and a generation processor adapted to generate a DE signal.

6 Claims, 9 Drawing Sheets

AUTOMATIC DETECTION OF SYNC POLARITY IN VIDEO TIMING AND GENERATION OF BLANKING PERIOD INDICATOR FROM SYNC INFORMATION

CROSS REFERENCE TO RELATED APPLICATIONS

[Not Applicable]

FEDERALLY SPONSORED RESEARCH OR DEVELOPMENT

[Not Applicable]

SEQUENCE LISTING

[Not Applicable]

BACKGROUND OF THE INVENTION

One embodiment of the present invention relates to system and method for generating an indicator signal from sync information in video timing. More specifically, one embodiment of the present invention relates to system and method for automatically generating a blanking period indicator signal from sync information in video timing.

Typically digital video signals have a minimum of sixty frames of video per second. Each video frame is composed of horizontal scan lines, where the number of horizontal scan lines in a frame is dependent on the resolution of the system. Each horizontal scan line includes a blanking period followed by a series of digital video pixels. More specifically, the horizontal sync (or Hsync) blanking period is used to send timing information. The Hsync blanking period is comprised of a Front Porch, a Synchronization Pulse and a Back Porch. Typically there is a vertical sync (or Vsync) blanking period that is comprised of a Front Porch, a Synchronization Pulse and a Back Porch. The Hsync and Vsync blanking periods typically take about 30% to 40% of the total available bandwidth.

Commercial applications utilizing Digital Visual Interface (hereinafter referred to as "DVI") frequently make significant use of existing VESA Computer Display standards. The sequence of timing and video data for particular display resolutions and timing is specified in the VESA Computer Display Monitor Timing standard, Version 1.0, Revision 0.8 dated Sep. 17, 1998, incorporated herein by reference. A recent digital television standard set forth in the CEA-EIA 861 specification for high-speed digital interfaces, is also incorporated herein by reference.

These standards identify a high-speed digital connection, interface or link for visual data types that are display technology independent. In one example, the interface provides a connection between a computer and its display device. In another example, the interface provides a connection between a set top box and a DTV or HDTV. Such a DVI interface enables content to remain in a lossless digital domain from creation to consumption; remain display technology independent; support plug and play through hot plug detection, and support EDID protocol; and provide digital and analog support in a single connector.

Further limitations and disadvantages of conventional, traditional and proposed approaches will become apparent to one of skill in the art, through comparison of such systems with the present invention as set forth in the remainder of the present application with reference to the drawings.

BRIEF SUMMARY OF THE INVENTION

Aspects of the present invention may be found in a system and method for generating a blanking period indicator signal form sync information in video timing. The invention comprises an auto polarity detect processor adapted to automatically detect the polarity of at least one sync signal and a generation processor adapted to generate a Data Enable (alternatively referred to as "DE") signal.

Other aspects, advantages and novel features of the present invention, as well as details of an illustrated embodiment thereof, will be more fully understood from the following description and drawings, wherein like numerals refer to like parts.

DETAILED DESCRIPTION OF THE INVENTION

The present invention relates to system and method for automatically generating a blanking period indicator signal from sync information in video timing. In one embodiment, multiple video and audio streams are transmitted over a DVI link. This includes the transmission of high quality, multi-channel audio over the DVI link, meeting the needs of the Consumer Electronics (hereinafter referred to as "CE") industry. Digital Video, Audio and Auxiliary (alternatively referred to as "DVAAA") represents the standard for use in the CE industry (among other industries) for transmitting high quality, multi-channel video, audio and auxiliary data over a digital video or DVI link.

Figure 1:
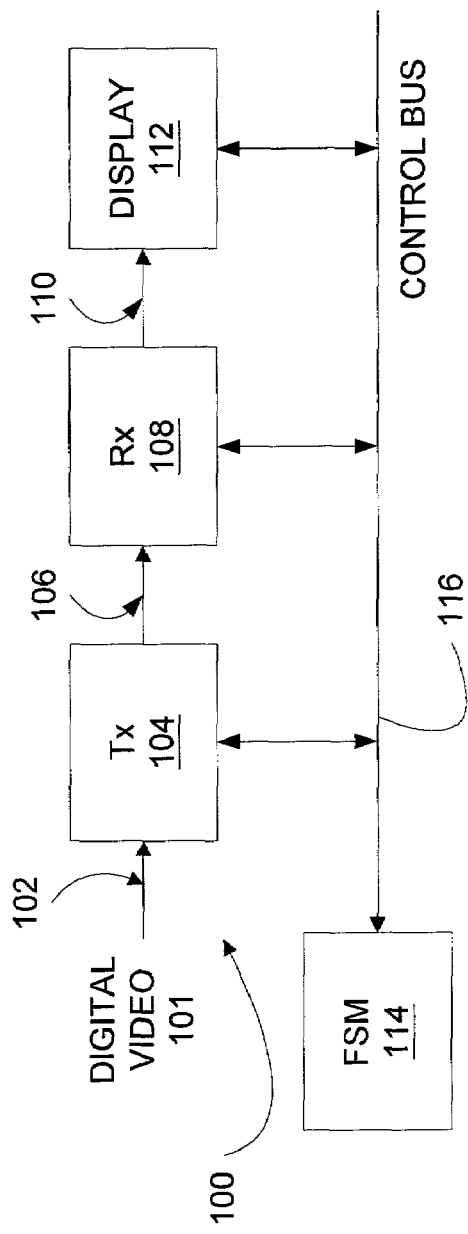
FIG. 1 illustrates a block diagram of an exemplary digital display link system.

FIG. 1 illustrates a block diagram of an exemplary digital display link system, generally designated 100. In the illustrated embodiment, system 100 includes a digital video source 101 connected to a digital video transmitter 104 via input lines 102. Transmitter 104 encodes the digital video data for transmission over a digital display link 106. On the display side of the system, receiver 108 decodes the digital signal received from digital display link 106 and produces a digital video signal transmitted via output lines 110 to display 112. The overall operation of the system may be controlled, for example, by finite state machine 114 using control bus 116.

Generally, the typical digital video signal includes sixty frames of video per second. Of course, the frame rate may be much lower or higher than 60 frames. For example, the frame rate may range can be from about 25 to 120 frames per second. A video frame is built up from or comprised of horizontal scan lines, where the number of horizontal lines in a frame is dependent on the resolution of the system.

Figure 2:
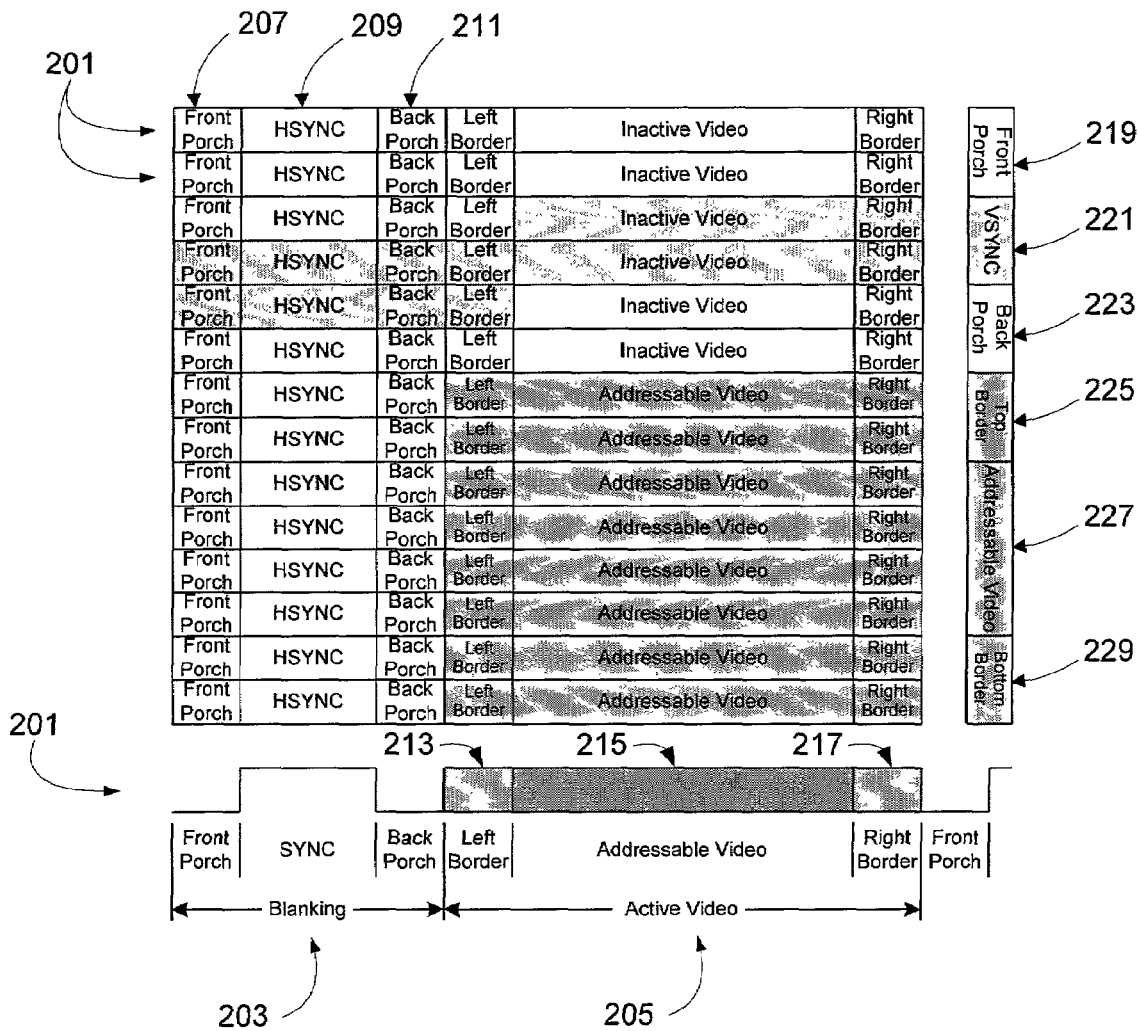
FIG. 2 is a stylized example of a digital video frame that illustrates timing information.

FIG. 2 illustrates a stylized example of a digital video frame that illustrates one embodiment of timing information. Each horizontal scan line 201 includes a blanking period or Hsync 203 followed by a series of digital video pixels (active video) 205. The horizontal blank is used for line timing. It is comprised of three elements: a Front Porch 207, a sync pulse 209 and a back porch 211. It should be appreciated that the sync pulse 209 may be either positive or negative.

Additionally, each horizontal scan line includes active video 205 comprising three elements: a left border 213, addressable video 215, and a right border 217. The length of the left border 213 and the right border 217 is often 0.

Various elements of a vertical frame are also illustrated in FIG. 2. Specifically, the vertical frame is comprised of a front porch 219, a vertical sync or Vsync pulse 221, a back porch 223, a top border 225, addressable video 227, and a bottom border 229. Like the Hsync pulse, the Vsync pulse may be either a positive or negative pulse, and the top and bottom borders 225 and 229 respectively are often 0.

Frames are stacked vertically, so that the entire video stream is a continuum of vertically stacked lines. All lines are then transmitted, in a serial fashion, left to right and top to bottom.

The sequence of video timing and video data is specified in the VESA and CEAEIA standards referenced above. The VESA Computer Display standard is used by digital video links such as DVI links. An exemplary DVI link has three serial channels for RGB video data and a clock channel.

Figure 3:
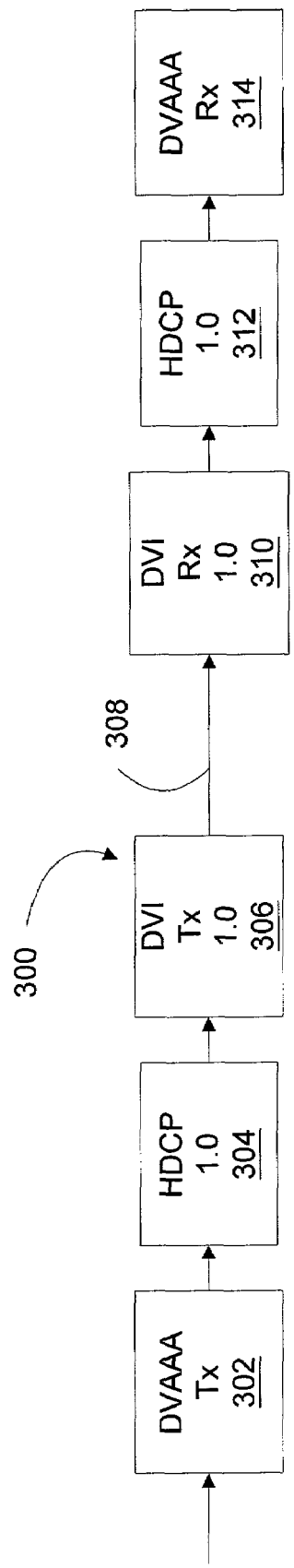
FIG. 3 illustrates a block diagram of a digital display link system with increased digital data capacity in accordance with one embodiment of the present invention.

A block diagram of one embodiment of a digital display link system with increased digital data capacity, generally designated 300, is illustrated in FIG. 3. In this embodiment, system 300 includes a DVAAA transmitter 302 that transmits information at a first timing standard to a HDCP engine or device 304. In this embodiment, all inputs to the system 300 may be compliant with the requirements of DVAAA and the other standards. The system 300 accepts a single stream of video data, one or more streams of audio data (from 0 to 8 streams for example), and one or more streams of auxiliary data (from 0 to 4 streams for example).

The HDCP engine 304 encrypts or transforms the information according to an HDCP standard 1.0. In one embodiment, the HDCP engine 304 receives the transmitted information and encrypts it. In another embodiment, the HDCP engine 304 may be omitted. A DVI transmitter 306 communicates with the HDCP engine 304. The DVI transmitter 306 transmits the video, audio and auxiliary data stream (with optional encryption) to the DVI receiver 310 via a digital video communications or DVI link 308. While the HDCP engine 304 and DVI transmitter 306 are illustrated as separate devices, it should be appreciated that a DVI transmitter with an integrated HDCP encryption engine is also contemplated.

The DVI receiver 310 communicates the aggregate information, with the modified sync timing, to a HDCP decryption engine or device 312, where the information is decrypted or reformed (i.e., transformed) according to an HDCP 1.0 standard. In one embodiment, the multiplexed unencrypted data is communicated to a DVAAA receiver 314, where it is demultiplexed and output as independent video, audio and auxiliary data streams. The timing input to the DVAAA transmitter 302 is reproduced, and the video stream is also output. While the HDCP decryption engine 312 and DVAAA receiver 314 are illustrated as separate devices, it should be appreciated that a DVAAA receiver with an integrated HDCP encryption engine is also contemplated.

In one embodiment of the present invention, the DVAAA receiver 34 includes an auto polarity detect processor (alternatively referred to as an "auto polarity detector") adapted to automatically detect the polarity of the sync signals as described below. In another embodiment, DVAAA receiver 314 includes a DE Generator processor adapted to generate a DE signal as described below. In yet another embodiment, DVAAA receiver 314 includes both the auto polarity detector processor and the DE generator processor.

Figure 4:
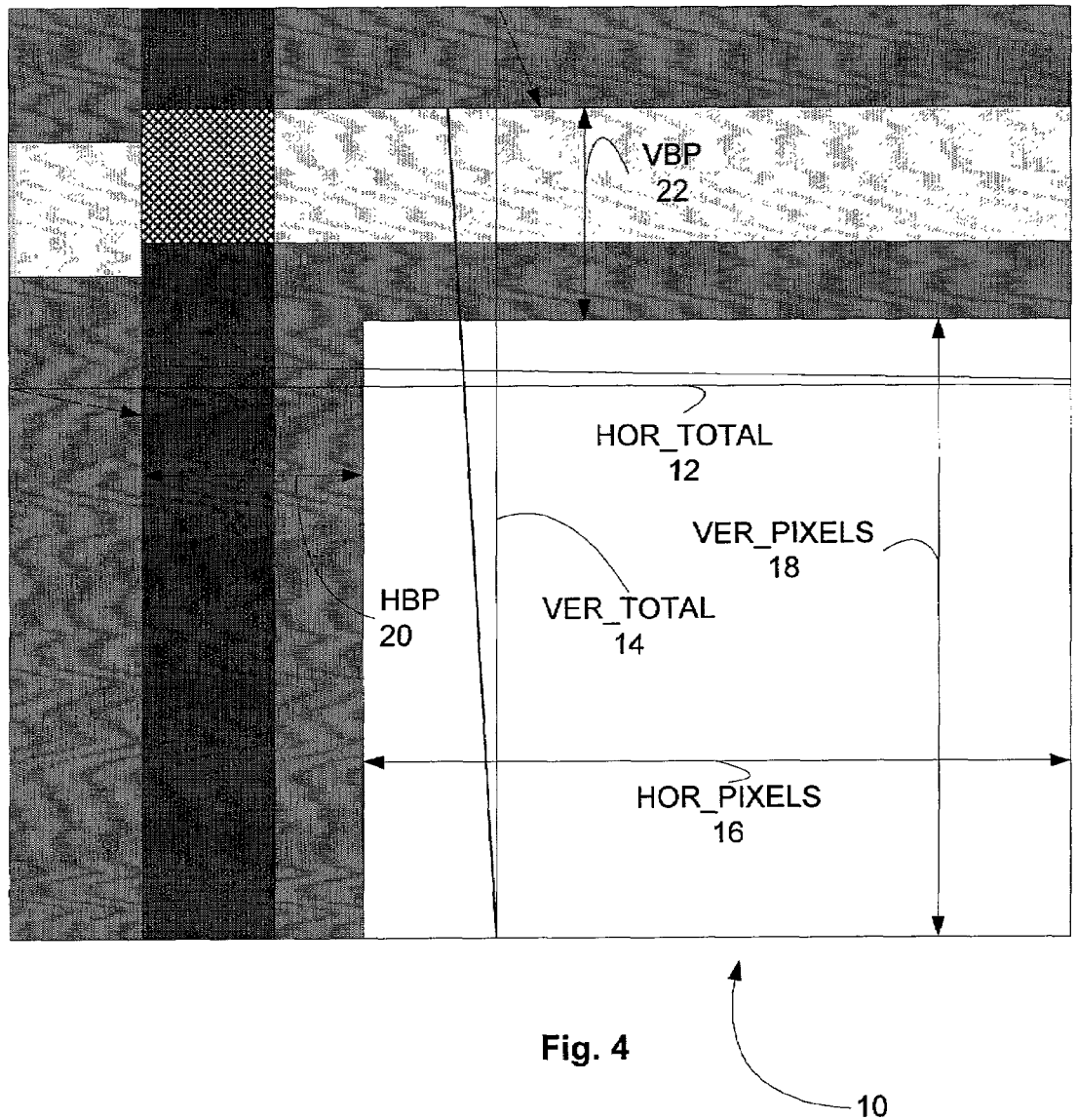
FIG. 4 illustrates video parameters used with configurable registers in accordance with one embodiment of the present invention.

FIG. 4 illustrates typical parameters of a video signal may be collected from the incoming video stream and/or explicitly written to configurable registers in accordance with one embodiment of the present invention. The parameters include an output HOR_TOTAL generally designated 12. HOR_TOTAL 12 corresponds to the VESA defined parameter HOR TOTAL TIME and is measured in pixels. In one embodiment of the present invention, HOR_TOTAL is computed from the rising edge of one Hsync pulse to a rising edge of another Hsync pulse. The parameters also include an output VER_TOTAL generally designated 14. VER_TOTAL 14 corresponds to the VESA defined parameter VER TOTAL TIME and is measured in lines. In one embodiment, VER_TOTAL is computed from the leading edge of one Vsync pulse to a leading edge of another Vsync pulse.

The parameters further include HOR_PIXELS generally designated 16. This parameter corresponds to the VESA defined parameter HOR PIXELS and is measured in pixels. HOR PIXELS 16 represents the active horizontal pixel resolution being displayed. The parameters also include input VER_PIXELS generally designated 18. VER_PIXELS 18 corresponds to the VESA defined parameter VER PIXELS and is measured in pixels. This register represents the active vertical pixel resolution being displayed.

Another input parameter is HBP, generally designated 20. This parameter corresponds to the number of pixels in a horizontal back porch (similar to backporch 211) plus the Hsync pulse width (similar to Hsync pulse 209) in pixels. Yet another input parameter is input VBP, generally designated 22. VBP 22 corresponds to a number of pixels in the vertical back porch (similar to back porch 223) plus the Vsync pulse width (similar to Vsync pulse 221) in lines.

Input/Output parameters in accordance with one embodiment of the present invention include HSYNC_POL and VSYNC_POL. HSYNC_POL specifies the polarity of the Hsync pulse, while VSYNC_POL specifies the polarity of the VSYNC pulse. For both HSYNC_POL and VSYNC_POL. Finally the present invention includes an input parameter AUTO_POL_DETECT. In one embodiment, if AUTO_POL_DETEC is inactive, the HSYNC_POL and VSYNC_POL are input signals used to specify the polarity of HSYNC and VSYNC pulses. In an embodiment in which the AUTO_POL_DETECT is active, the HSYNC_POL and VSYNC_POL are output signals only and the polarity of the Hsync and Vsync pulses is automatically detected.

One embodiment of the present invention also includes an auto polarity detect processor that determines the polarity of the sync pulses. In this embodiment, the period of the sync pulse is shorter than the period of the non-sync pulse.

Figure 5:
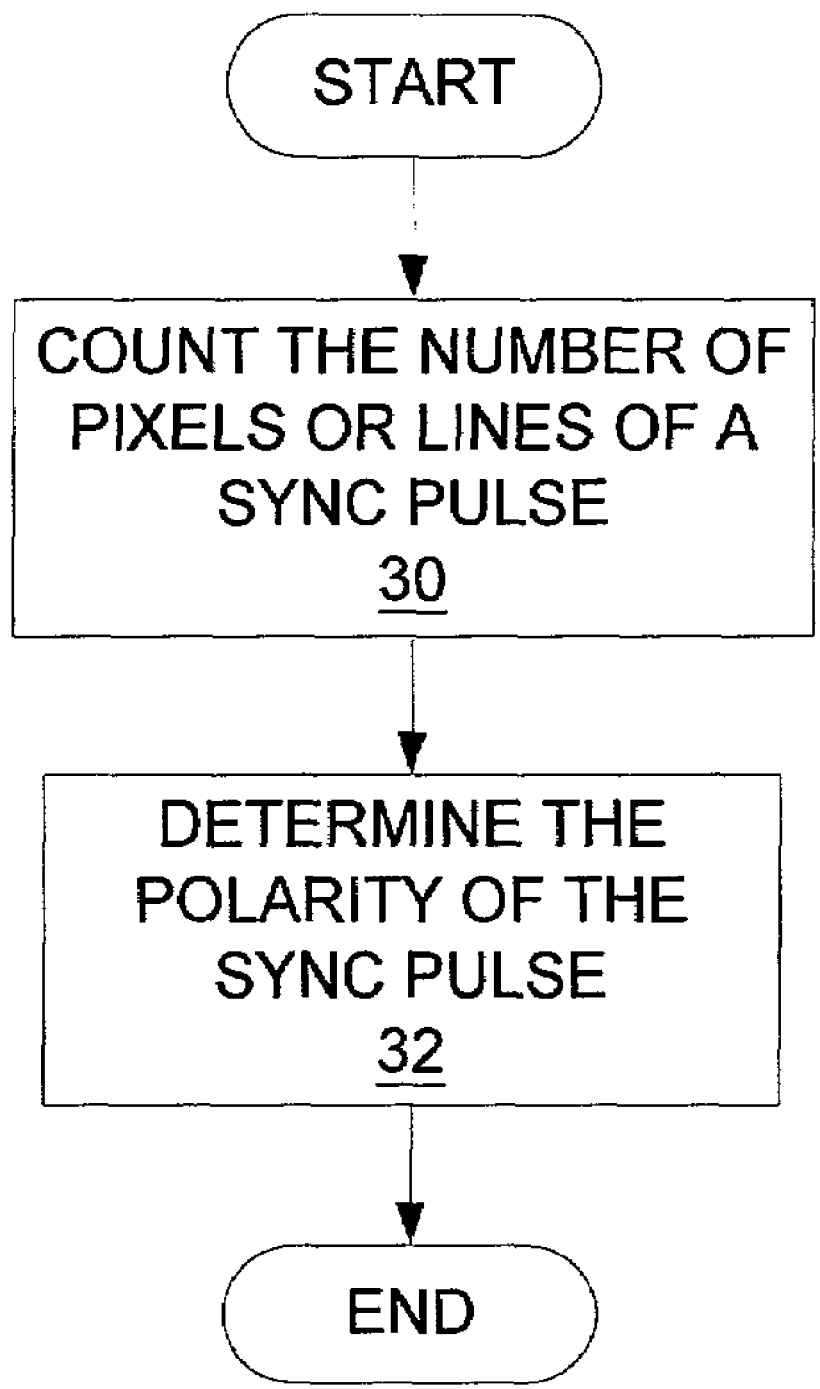
FIG. 5 illustrates a high level flow diagram of one method for determining the polarity of a sync pulse in accordance with one embodiment of the present invention.

FIG. 5 illustrates a high level flow diagram of one method of determining the polarity of a sync pulse in accordance with one embodiment of the present invention. In this embodiment, the polarity of the sync pulse is determined using an auto polarity detect processor similar to that described previously. The auto polarity detect processor counts the number of pixels or lines of a sync pulse as illustrated by block 30. The processor then determines the polarity of the sync pulse as illustrated by block 32.

Figure 6A:
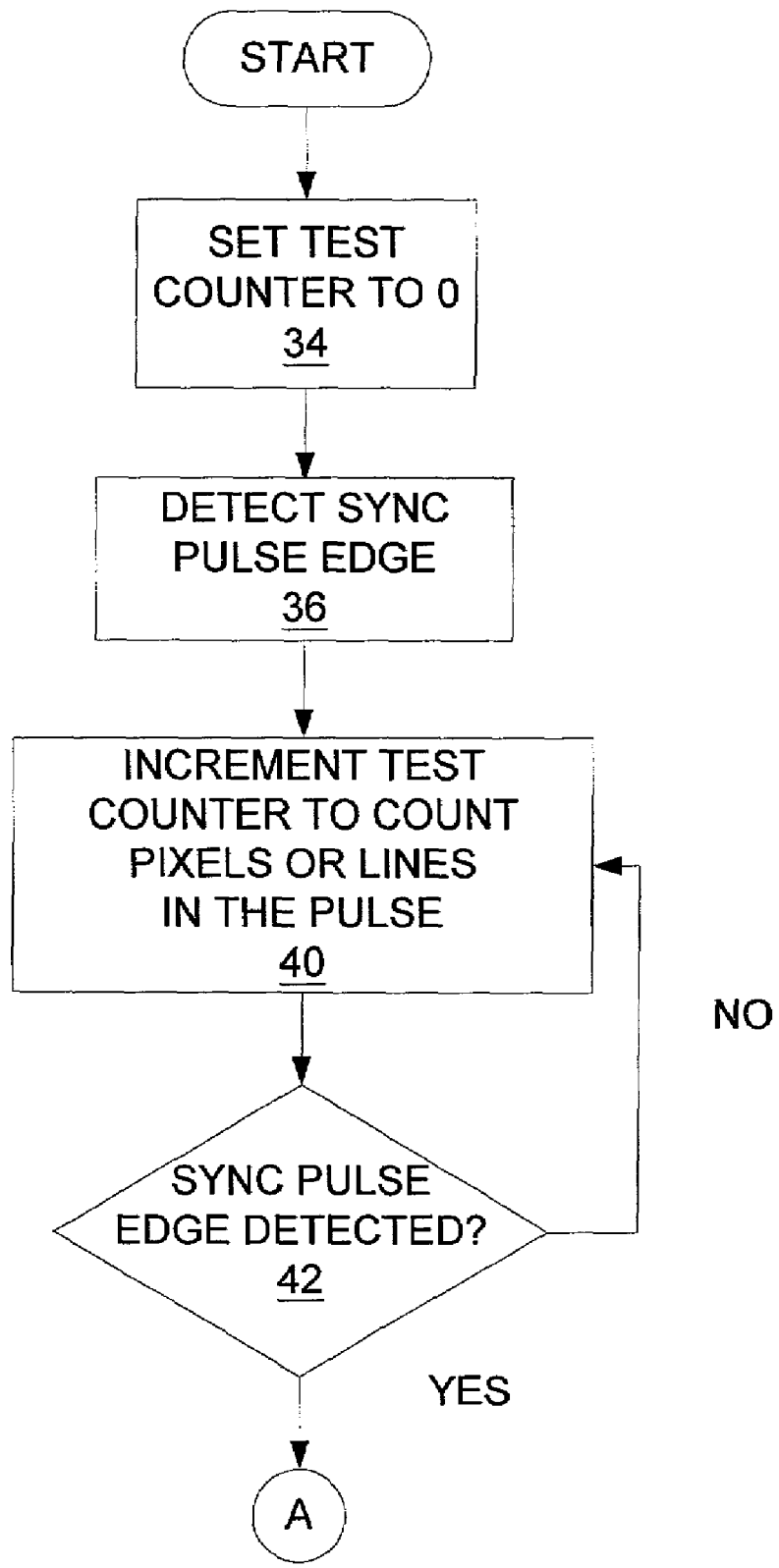
FIGS. 6A and 6B illustrate a detailed flow diagram of one method for determining the polarity of a sync pulse similar to that illustrated in FIG. 5 in accordance with one embodiment of the present invention.
Figure 6B:
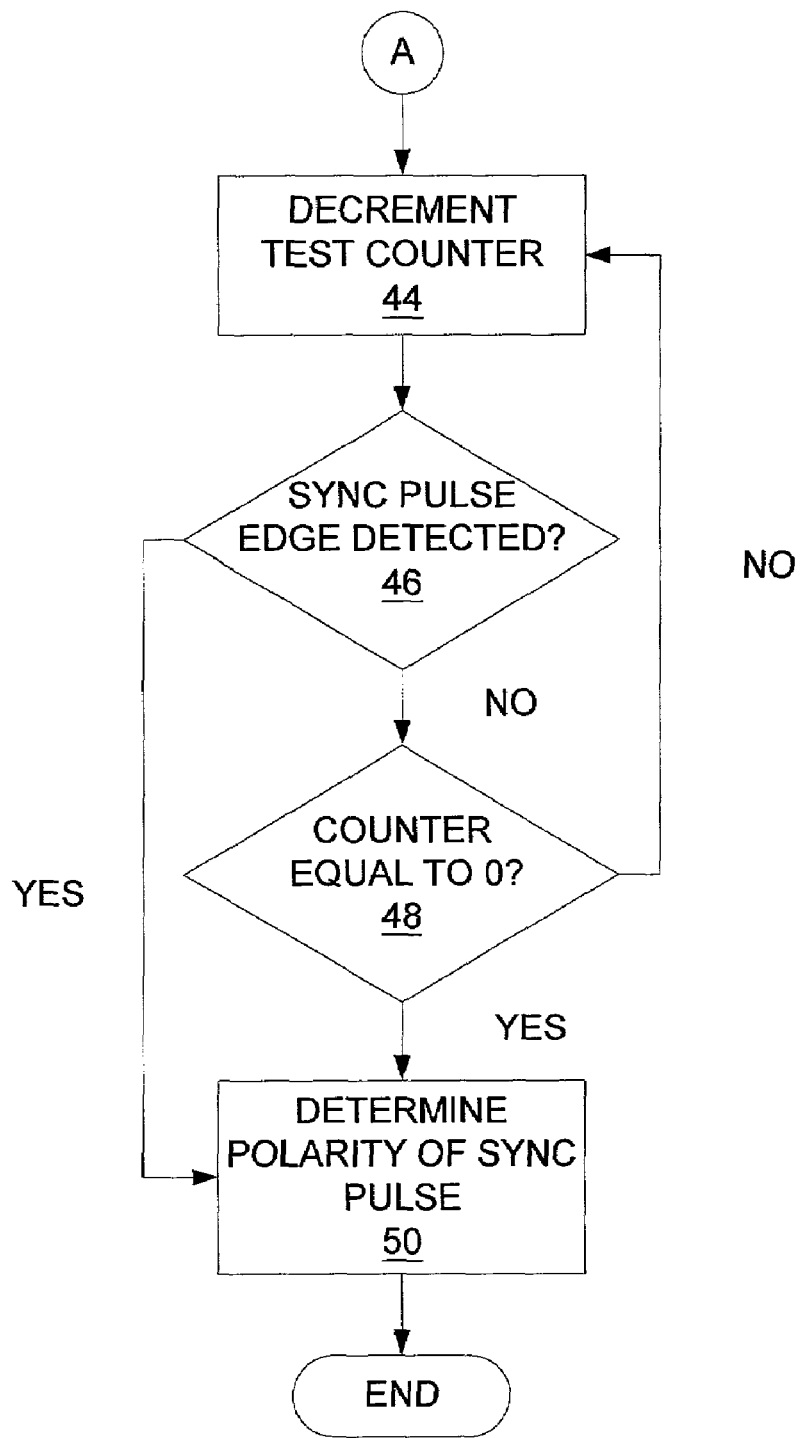

FIGS. 6A and 6B illustrate a detailed flow diagram of one method of determining the polarity of a sync pulse in accordance with one embodiment of the present invention. In this embodiment, the polarity of the sync pulse is determined using an auto polarity detect processor similar to that described previously. The test counter is set to zero as illustrated by block 34. The auto polarity detect processor detects a first sync pulse edge as illustrated by block 36.

If the sync pulse edge is detected, the test counter begins to increment as illustrated by block 40. In one embodiment, it is contemplated that the test counter is incremented to count the number of pixels (Hsync for example) or lines (Vsync for example) until a second edge of the sync signal is detected as illustrated by diamond 42. If the edge of the second edge of the sync signal is not detected, the processor continues to increment the test counter until the second edge of the sync signal is detected. While one embodiment of the present invention detects one or more edges of the sync signals, it is contemplated that the processor may detect transitions of the signals.

The auto polarity detect processor decrements the test counter as illustrated by block 44. The processor determines if a third edge on the sync signal is detected as illustrated by diamond 46. If this edge is detected, the processor determines that the pulse just ended and the polarity of the pulse is the level of the sync signal prior to the third edge as illustrated in block 50.

If the sync pulse edge is not detected, the auto polarity detect processor determines if the counter has reached (is equal to) zero as illustrated by diamond 48. If the counter has not reached zero, the test counter is decremented as illustrated by block 44. If however, the counter has reached zero, then the next edge is a start of the pulse. The polarity of the pulse is the inverse of the polarity of the sync signal when the counter reaches 0 as illustrated previously by block 50.

Figure 7:
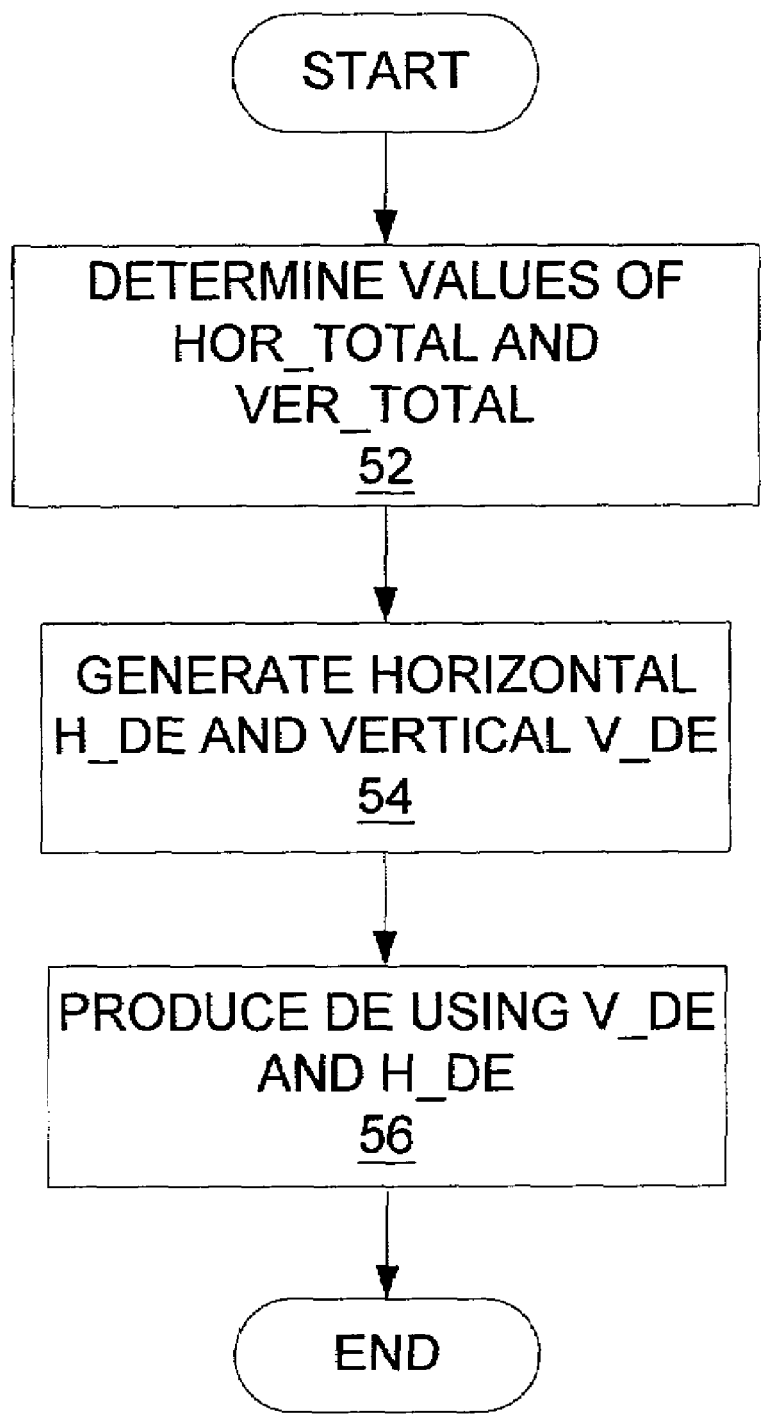
FIG. 7 illustrates a high level flow diagram of one method for generating a DE signal in accordance with one embodiment of the present invention.

The present invention also includes a DE generation processor, which performs the following steps to generate a DE signal. FIG. 7 illustrates a high level flow diagram of one method for generating a DE signal in accordance with one embodiment of the present invention. The generation processor determines the values of HOR_TOTAL and VER_TOTAL as illustrated by block 52. The processor generates the horizontal H_DE and vertical V_DE, and produces the H_DE and V_DE as illustrated by blocks 54 and 56 respectively.

Figure 8A:
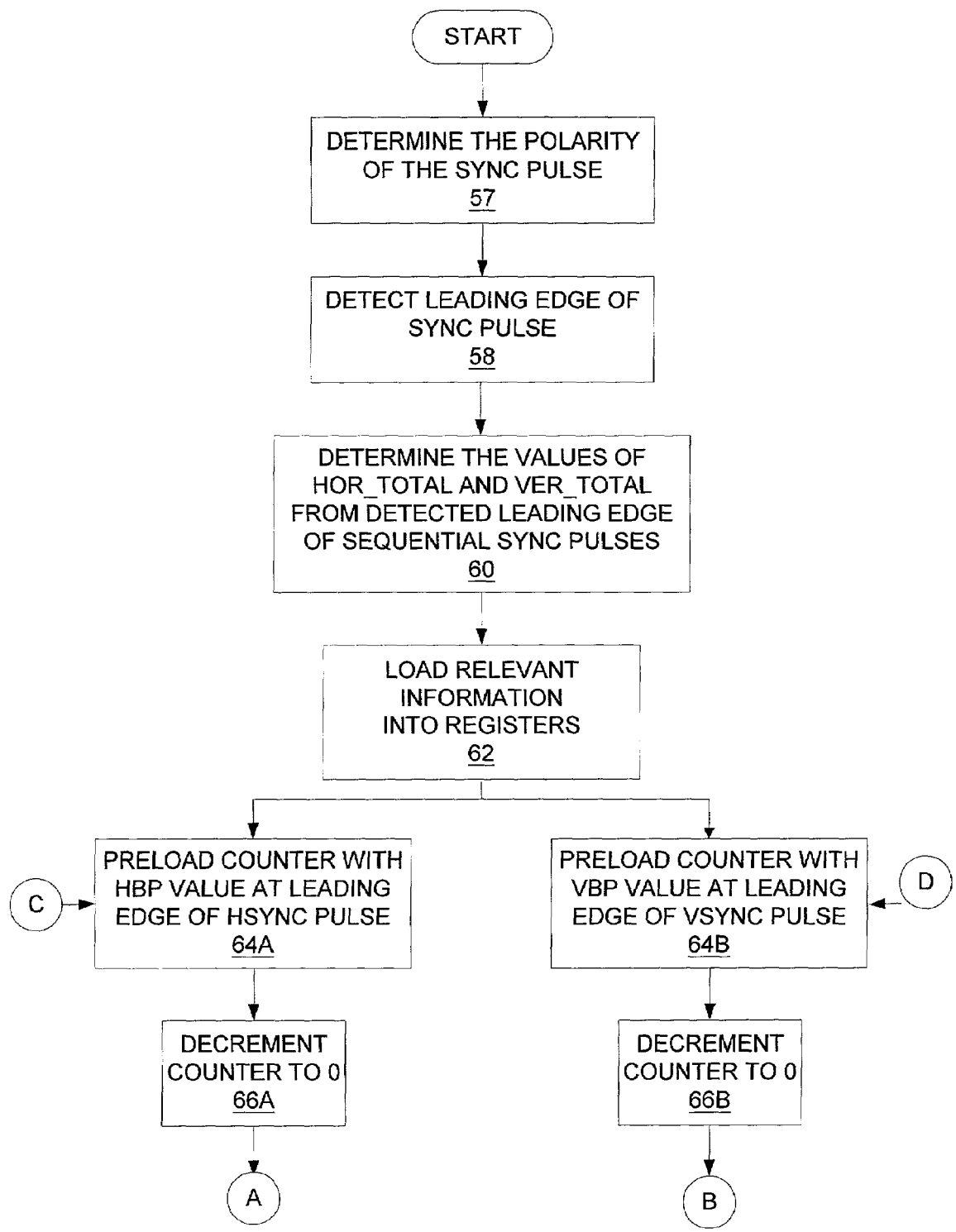
FIGS. 8A and 8B illustrate a detailed flow diagram of one method for generating a DE signal similar to that illustrated in FIG. 7 in accordance with one embodiment of the present invention.
Figure 8B:
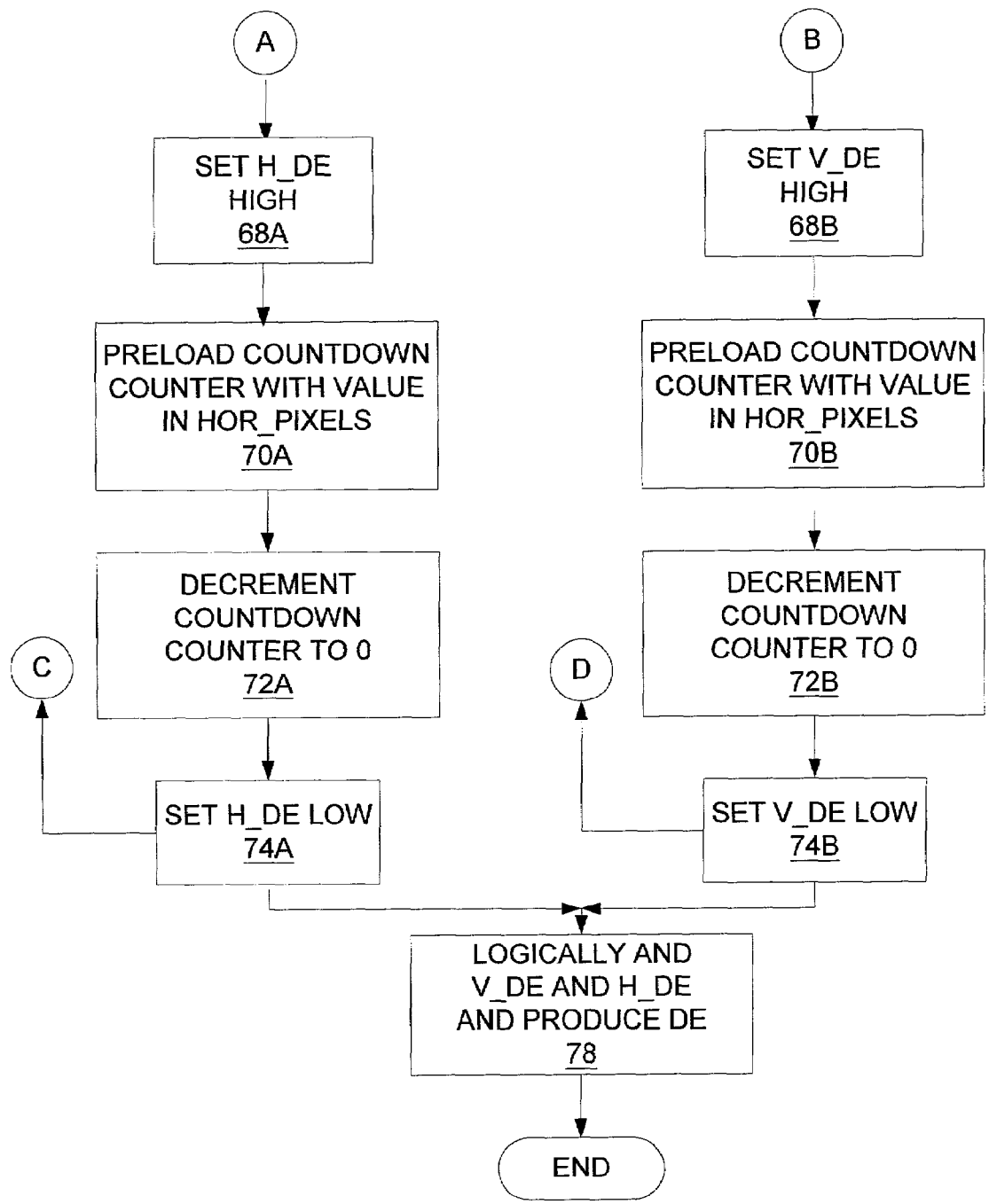

FIGS. 8A and 8B illustrate a detailed flow diagram of one method for generating a DE signal similar to that illustrated in FIG. 7 in accordance with one embodiment of the present invention. The polarity of the sync pulses are determined as illustrated by block 57. The DE generation processor detects a leading edge of the sync pulse and determines the values of HOR_TOTAL and VER_TOTAL as illustrated by blocks 58 and 60. All the relevant information is loaded into a register as illustrated by block 62. The DE generation processor generates the horizontal H_DE by preloading a countdown counter with the value HBP at the leading edge of the Hsync pulse at illustrated by block 64A. It is contemplated that the leading edge of the Hsync pulse may be either rising or falling depending on the setting of the HSYNC_POL.

The countdown counter counts down or is decremented to zero as illustrated by block 66A. At zero H_DE is set high and the countdown counter is preloaded with a value in HOR_PIXELS as illustrated by blocks 68A and 70A. When the countdown counter reaches zero, H_DE is set low as illustrated by block 74A. The horizontal H_DE is thus generated, and the countdown counter is preloaded with the value HVP at the leading edge of the Hsync pulse. In one embodiment, the horizontal H_DE is generated in a repetitive manner.

In order to generate the V_DE signal the countdown counter is preloaded with the value VBP at the leading edge of the Vsync pulse as illustrated by block 64B. It is again contemplated that the leading edge of may be either rising or falling depending on the setting of VSYNC_POL. The countdown counter then counts or is decremented to zero as illustrated by block 66B. HSYNC_POL and VSYNC_POL may be set explicitly in one embodiment of the present invention. In another embodiment, the polarities may be determined as provided previously.

zero V_DE is set high and a countdown counter is preloaded with a value in HOR_PIXELS as illustrated by blocks 68B and 70B. When the countdown counter reaches zero, V_DE is set low as illustrated by block 74B. The vertical V_DE is generated, and the countdown counter is preloaded with the value VBP at the leading edge of the Vsync pulse. In one embodiment, the vertical V_DE is generated in a repetitive manner.

Finally V_DE and H_DE are logically ADDED to produce DE as illustrated by block 78. In one embodiment of the present invention, the edges of the Hsync and Vsync pulses are coincident. However, other embodiments are contemplated were the Hsync and Vsync pulses are not coincident. Further, embodiments are contemplated wherein the polarity of the Hsync and Vsync pulses are specified by HSYNC_POL and VSYNC_POL respectively. For example, interlaced timings.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A method for determining a polarity of a sync pulse, said method comprising:

counting a number of pixels or lines;

determining that the polarity of the sync pulse is the same as a previously determined polarity, if the sync pulse is detected before the counted number of pixels or lines is equivalent to a certain value; and determining that the polarity of the sync pulse is the opposite of the previously determined polarity, if the counted number of pixels or lines is equivalent to a certain value.

2. The method of claim 1, wherein counting a number of pixels comprises:

loading a counter with the certain value; and decrementing contents of the counter.

3. The method of claim 1, further comprising:
    determining the certain number, wherein determining the certain number further comprises:
        detecting a first pulse edge; and
        incrementing contents of a counter until detecting a second pulse edge.

4. A circuit for determining a polarity of a sync pulse, said method comprising:
    a counter for counting a number of pixels or lines; and
    a processor for determining that the polarity of the sync pulse is the same as a previously determined polarity, if the sync pulse is detected before the counted number of pixels or lines is equivalent to a certain value and determining that the polarity of the sync pulse is the opposite of the previously determined polarity, if the counted number of pixels or lines is equivalent to a certain value.

5. The circuit of claim 4, wherein the counter is loaded with the certain value and is decremented.

6. The circuit of claim 4, wherein the certain number is determined by:
    detecting a first pulse edge; and
    incrementing contents of the counter until detecting a second pulse edge.

* * * * *